(12) United States Patent
Hasson et al.

(10) Patent No.: US 8,346,670 B2
(45) Date of Patent: Jan. 1, 2013

(54) SYSTEM FOR CONTROLLING USER ACCESS TO A SERVICE

(75) Inventors: Robert Hasson, Antibes (FR); Najib El Mokhtari, Valbonne (FR); Kerry Hurley, London (GB); Charles Kitson, London (GB); Chris Walker, London (GB)

(73) Assignee: Accenture Global Services Limited, Dublin (IE)

( * ) Notice: Subject to any disclaimer, the term of this patent is extended or adjusted under 35 U.S.C. 154(b) by 61 days.

(21) Appl. No.: 12/609,313

(22) Filed: Oct. 30, 2009
(Under 37 CFR 1.47)

(65) Prior Publication Data

US 2010/0280958 A1    Nov. 4, 2010

(30) Foreign Application Priority Data

Oct. 31, 2008 (EP) .................... 08305763

(51) Int. Cl.
*G06Q 30/00* (2012.01)
(52) U.S. Cl. ............ 705/75; 705/44; 235/382; 340/10.1
(58) Field of Classification Search ............ 705/44, 705/75; 340/10.1; 235/382
See application file for complete search history.

(56) References Cited

U.S. PATENT DOCUMENTS

| | | | |
|---|---|---|---|
| 4,891,503 A | | 1/1990 | Jewell |
| 5,285,382 A | * | 2/1994 | Muehlberger et al. .......... 705/17 |
| RE40,254 E | * | 4/2008 | Nikula et al. ................. 370/442 |
| 7,374,082 B2 | | 5/2008 | Van de Velde |
| 2006/0278704 A1 | | 12/2006 | Saunders |
| 2008/0033880 A1 | * | 2/2008 | Fiebiger et al. ................. 705/44 |
| 2008/0140516 A1 | * | 6/2008 | Silbernagl et al. .............. 705/13 |
| 2008/0156873 A1 | | 7/2008 | Wilhelm |
| 2008/0179394 A1 | * | 7/2008 | Dixon et al. .................. 235/380 |
| 2012/0145892 A1 | * | 6/2012 | Gershman et al. ............ 250/282 |

FOREIGN PATENT DOCUMENTS

| | | |
|---|---|---|
| WO | 2007143740 A2 | 12/2007 |
| WO | WO2007/143740 A2 * | 12/2007 |

OTHER PUBLICATIONS

EMV Integrated Circuit Card Specifications for Payment Systems, Book 3, "Application Specification", Version 4.2, Jun. 2008, 238 pages.*
European Search Report issued in EP 08305763 on Feb. 20, 2009.
P. 116 of EMV Specification Version 4.2, Book 3; Full spec available at http://www.emvco.com/specifications.aspx?id=155.

* cited by examiner

*Primary Examiner* — James D Nigh
(74) *Attorney, Agent, or Firm* — Vedder Price PC

(57) ABSTRACT

The invention concerns a system for controlling user access to a service having a read device (210) arranged to contactlessly read a payment card (211) of a user; and a control block (214) coupled to an entry gate (202), the control block arranged to determine whether online payment authorization should be requested for the payment card, wherein if it is determined that online payment authorization should be requested, the control block is arranged to allow the user access to the service prior to completing an online payment authorization for the payment card.

14 Claims, 3 Drawing Sheets

| ACCOUNT | CONTROL | |
|---|---|---|
| CARD NO. | PRE-PAYMENT AUTH | ACC |
| 4685..... | 10 | 5.25 |
| 3895..... | 5 | 2.20 |
| 4188..... | 10 | 9.80 |
| ⋮ | ⋮ | ⋮ | ion, the system further comprises a memory portion storing

SYSTEM FOR CONTROLLING USER ACCESS TO A SERVICE

FIELD OF THE INVENTION

The present invention relates to a system and method for controlling access by a user to a service, and in particular to a system and method for controlling user access and receiving payment from a user by reading a contactless payment card of the user.

BACKGROUND TO THE INVENTION

FIG. 1 illustrates a contactless payment card 100, which is for example a VISA, MASTERCARD or other type of credit or debit payment card. The contactless payment card 100 comprises an RFID (radio frequency identification) transponder 102, which allows contactless communication with a terminal 104. In particular, terminal 104 comprises a reader 106, which is able to communicate with the RFID transponder 102. The contactless payment card 100 may also comprise a contact interface 108, allowing payments to be made using a card reader (not shown) that makes physical contact with the card 100, as an alternative to the contactless interface.

An advantage of contactless payment cards is that payment may be made without removing the card from its wallet, and wear and tear is reduced when compared to cards that make physical contact, such as those using a magnetic strip or chip contacts to communicate with a terminal.

Payment card 100 may be used to pay for a wide range of products or services, in shops, hotels, transport networks etc. However, certain services, such as mass transit systems, may receive a high number of users, and there is a technical problem in processing payment transactions by contactless payment cards sufficiently quickly to avoid congestion at the entrance to such services.

SUMMARY OF THE INVENTION

Embodiments of the present invention aim to at least partially address one or more problems in the prior art.

According to one aspect of the present invention, there is provided a system for controlling user access to a service comprising: a read device arranged to contactlessly read a payment card of a user; and a control block coupled to an entry gate, the control block arranged to determine whether online payment authorization should be requested for the payment card, wherein if it is determined that online payment authorization should be requested, the control block is arranged to allow the user access to the service prior to completing an online payment authorization for the payment card.

According to an embodiment of the present invention, the system further comprises a memory portion storing a white list indicating payment cards that should be authorized without online payment authorization, wherein the control block is arranged to add the payment card to the white list if the online payment authorization is granted for that payment card.

According to a further embodiment of the present invention, the white list comprises a list of identifiers each associated with payment cards; the read device is arranged to read an identifier of the payment card; and the control block is arranged to determine that an online payment authorization should be requested if the read identifier of the payment card is not on the white list.

According to a further embodiment of the present invention, the system further comprises a memory portion storing a hot list indicating payment cards that should not be accepted by the system, wherein the control block is arranged to add the payment card to the hot list if the online payment authorization is denied for that payment card.

According to a further embodiment of the present invention, the control block is arranged determine that an online payment authorization should be requested if the payment card is not on the white list and if a request for offline payment authorization of the payment card is denied.

According to a further embodiment of the present invention, the control block is arranged to request, after allowing the user access to the service, the online payment authorization for a payment value greater than a minimum charge associated with the use of the service.

According to a further embodiment of the present invention, the control block is arranged to allow the user access to the service by controlling an entry gate to open, and wherein the system further comprises an exit gate comprising a further read device for contactlessly reading the payment card.

According to a further embodiment of the present invention, the read device is arranged to contactlessly read the payment card by retrieving data from an RFID (radio frequency identification) transponder of the payment card.

According to another aspect of the present invention, there is provided a ticket barrier comprising the above system and an entry gate controllable by the control block to allow the user to access the service.

According to another aspect of the present invention, there is provided a method of controlling user access to a service comprising contactlessly reading by a read device a payment card of a user; determining by a control block whether or not online payment authorization should be requested for the payment card; and if it is determined that online payment authorization should be requested for the payment card, controlling an entry gate by the control block (214) to allow the user access to the service prior to completing an online payment authorization for the payment card.

DETAILED DESCRIPTION OF EMBODIMENTS OF THE INVENTION

Figure 2:
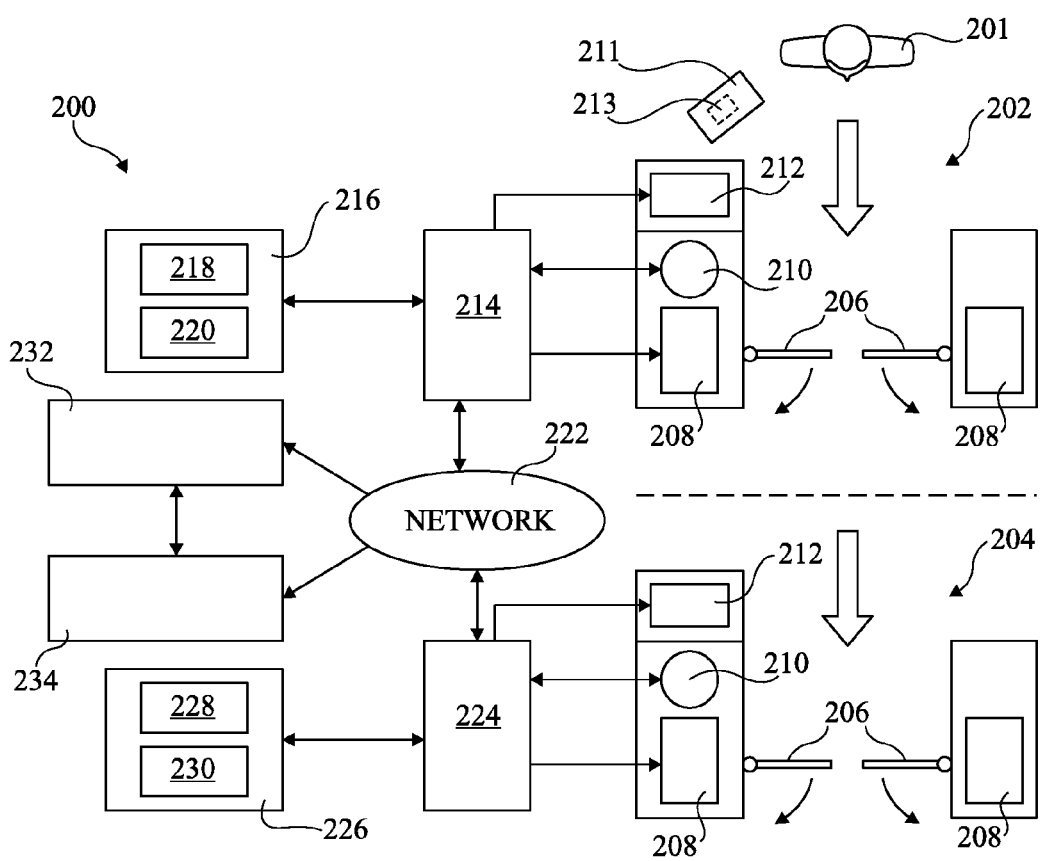
FIG. 2 schematically illustrates a system for controlling access to a service according to an embodiment of the present invention.

FIG. 2 illustrates a system 200 for controlling user access to a service. The service is for example a mass transit system, such as an underground/over-ground rail network, but could be any type of service, including an amusement park, art gallery, concert hall etc.

A user 201 is shown in FIG. 2 who for example wishes to access a service. The system 200 comprises an entry gate 202 and an exit gate 204, shown schematically in plan view. The entry and exit gates 202, 204 may be spaced close together or very far from each other, depending on the type of service accessed via the gates, and in practise there may be tens, hundreds or even thousands of entry and exit gates 202, 204. For example a few entry and exit gates 202, 204 could be provided in each station of a rail network.

Each of the entry and exit gates 202, 204 comprises a pair of swinging gates 206, which may be opened and closed by control motors 208 to allow/prevent a user entering/exiting the service. In alternative embodiments, the entry and exit gates 202, 204 could comprise turnstiles, or alternative means for restricting entry/exit.

Each of the entry and exit gates 202, 204 also comprises a contactless payment card reader 210, which is able to read contactless payment cards, such as a payment card 211 shown in FIG. 2. The entry and exit gates 202, 204 also each comprises a display 212, for displaying information to the user.

Figure 1:
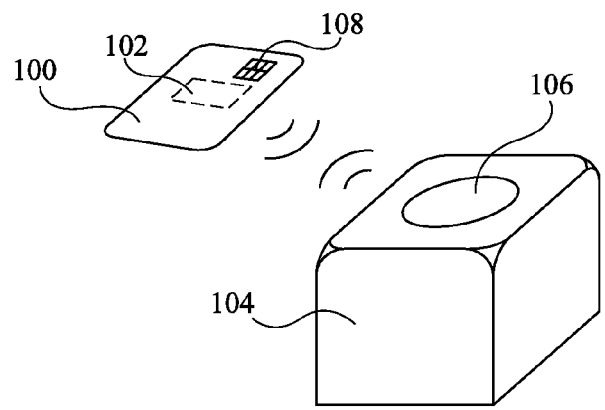
FIG. 1 (described above) illustrates a contactless payment card and a terminal according to one example.

The readers 210 are for example able to read contactless payment cards comprising RFID (radio frequency identification) technology. In particular, payment card 211 comprises an RFID transponder 213. Payment card 211 is for example the same as card 100 of FIG. 1, and in addition to the RFID transponder 213, may comprise a magnetic strip, and/or chip.

The entry gate 202 is associated with a control block 214, which is coupled to the control motor 208, the contactless payment card reader 210 and the display 212 of the entry gate 202. Furthermore, the control block 214 is coupled to a memory 216, which stores, in a first memory portion 218, a white list indicating payment cards for which online payment authorization should not be requested, and in a further memory portion 220, a hotlist indicating payment cards which should be refused by the system, for example because online payment authorization has been refused, or because they are invalid for other reasons.

The control block 214 is coupled to a network 222. In some embodiments, it is permanently coupled to the network 222, while in alternative embodiments, such as in the case that the entry gate is on a bus, the control block may be coupled to the network 222 at regular periods, such as every time the bus returns to the depot.

The control block 214 may be coupled via network 222 to a control block 224 of the exit gate 204. Control block 224 is coupled to the control motor 208, card reader 210 and display 212 of the exit gate 204. The control block 224 is additionally coupled to a memory 226, which stores in a memory portion 228 the white list, and in a memory portion 230, the hot list, which are for example the same as those in memory 216, and are updated with modifications via network 222.

Network 222 also provides the control blocks 214 and/or 224 with access to a remote authorization terminal 232 associated with the card issuer of the contactless payment card 211 presented at the entry gate 202, and to a back office server 234, which controls management of the system as well as billing.

Network 222 may be formed of one or more wired or wireless networks, such as LANs (local area networks), WLANs (wireless LANs), the PSTN (public switched telephone network), and/or the internet.

In operation, when the user 201 arrives at the entry gate 202 and presents the payment card 211 to the card reader 210, the card reader 210 reads the card contactlessly, and provides card details to the control block 214. In particularly, the reader 210 reads and provides to the control block 214 a card identifier, which is for example the 16-digit card number associated with most types of credit/debit cards. The card reader 210 may also read other data, such as the expiry date of the card.

The control block 214 checks whether the card identifier matches any of a list of identifiers stored in the white list of memory portion 218 or any of a list of identifiers stored in the hot list of memory portion 220. If the payment card 211 is in the white list, the control block 214 for example requests a cryptogram from the payment card, which is checked to certify that the payment card is genuine, and then controls the control motors 208 of the entry gate 202 to open the pair of gates 206 and allow the user access to the service. If the payment card 211 is in the hot list, or the cryptogram is false, the control block 214 will not open the gates 206, and will instead display a message on the display 212 indicating that access to the service is denied. The user 201 will then need to contact their card issuer to determine the reason for the non-authorization of the payment card.

If, on the other hand, the payment card 211 is on neither the white list nor the hot list, then this payment card has for example never been used for accessing this service before, and is unknown to the system. In this case, to ensure that the card is valid and that a payment transaction will be honoured by the card issuer, a payment authorization should be obtained.

There are for example two types of payment authorization that can be obtained: online payment authorizations and offline payment authorizations. Offline authorizations and their implementation are for example discussed in specifications by EMV (Europay, MasterCard, Visa), for example in "EMV contactless specifications for payment systems-entry point specification". The names "EMV", "Europay", "MasterCard" and "Visa" may be trademarks owned by others.

To obtain an online authorization, a request is made directly to the remote authorization terminal 232 associated with the card issuer, to verify that the transaction amount is authorized. The request is based on an online authorization cryptogram generated by the payment card 211, for example an ARQC (authorization request cryptogram). The ARQC is requested by the control block 214 from the payment card 211, and received via the read device 210. A connection with the remote authorization terminal 232 is then established, and the ARQC is transmitted to the terminal 232, which verifies the ARQC and grants or denies the request. Generally, the request will be granted, as refusal will generally mean either that the card has been reported stolen or that the user's card account is frozen.

To obtain an offline authorization, a connection with the remote authorization terminal 232 is not established, and instead, authorization is automatically granted based on an offline authorization cryptogram generated by the payment card 211. However, generally only a certain value of offline authorizations are allowed before an online authorization should be requested. The number and/or value of offline authorizations made since the previous online authorization are for example stored by a counter in the payment card, as will be described in more detail below.

The choice between first attempting an offline authorization or directly requesting an online authorization will depend on a number of factors, including the type of service and cost of the service that the user wishes to access, the type of payment card, etc. The choice may be applied by the system in all cases. For example, offline authorizations may never be attempted by the system, or offline authorizations may always be attempted first by the system before an online authorization is attempted. Alternatively, the offline authorization could be attempted first for certain cards, such as those originating from a foreign country, whereas online authorizations could be used directly for other cards, such as those originating from the country of the system 200.

If an offline authorization is requested and is successful, then the payment card is for example added to the white list 218 of memory 216. The gates 206 of the entry gate 202 are then opened to allow the user 201 to access the service. On the other hand, if an online payment authorization is to be requested, either directly, or after a failed offline authorization, the control block 214 makes the online payment authorization request via the network 222 to the remote authorization terminal 232 of the card issuer. However, rather than waiting for online payment authorization to be completed, control block 214 opens the gates 206 of the entry gate 202 to allow the user to access to the service. The online payment authorization could take at least a number of seconds and in some cases more than a minute to complete, and therefore, by opening the gates before the online payment authorization is completed, delay to the user 201 is avoided.

In some embodiments the online payment authorization request is always sent by the control block 214 after access to the service is granted, and in particular, if the control block 214 is not permanently coupled to the network 222, the request is made the next time the control block 214 is coupled to the network 222.

In most cases the payment card 211 will be valid, and therefore the online payment authorization will be granted by the remote authorization terminal 232. In this case, the identifier of the payment card 211 is added to the white list 218 of memory 216, such that in the future the payment card 211 may be immediately accepted. On the other hand, in cases that the online payment authorization request is denied, the control block 214 adds the identifier of the payment card to the hot list 220 of memory 216. This means that a user presenting payment card 211 will be denied access to the service in the future.

It should be noted that in some embodiments the white list of memory 218 could store not only payment cards of returning unknown users, in other words users for which an online or offline authorization has been granted, but also payment cards of pre-registered users, who have for example registered a billing address with the provider of the service, and who may for example have purchased products such as a pass allowing access to the service for a given period of time.

When the user is ready to leave the service, the user for example exits via the exit gate 204. Upon presenting the same payment card 211 as used for entry to the service, the reader 210 of the exit gate 204 reads the payment card 211 and provides the card details to control block 224. Control block 224 then for example directly allows the user to exit the service by opening gates 206, or may first check whether the card identifier matches an identifier stored on either the white list of memory portion 228 or the hot list of the memory portion 230, as explained in more detail below.

Figure 3:
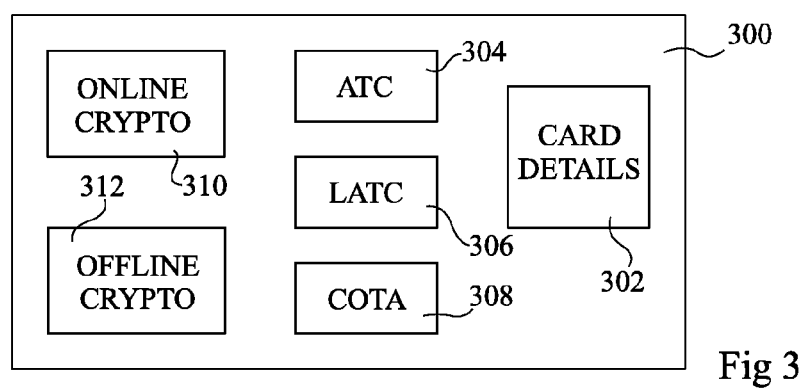
FIG. 3 schematically illustrates an integrated circuit of a contactless payment card according to an embodiment of the present invention.

FIG. 3 illustrates an integrated circuit 300 of the payment card 211 according to one example. The integrated circuit 300 comprises a memory portion 302 storing the card details relating to payment card 211, such as the 16-digit card number, expiry date, etc. An ATC (automatic transaction count) counter 304 counts each time the integrated circuit 300 is accessed during payment transactions. An LATC (last automatic transaction count) memory 306 stores the value of the ATC count at the last time an online authorization was made. Thus the ATC counter minus the LATC counter is equal to the number of offline translations performed since the last online transaction. A COTA (cumulative offline transaction amount) counter 308 keeps track of the total currency amount spent since the previous online authorization. An online cryptogram generation block 310 generates online authorization cryptograms for use in online authorizations, while an offline cryptogram generation block 312 generates offline authorization cryptograms for use in offline payment authorizations.

Figure 4:
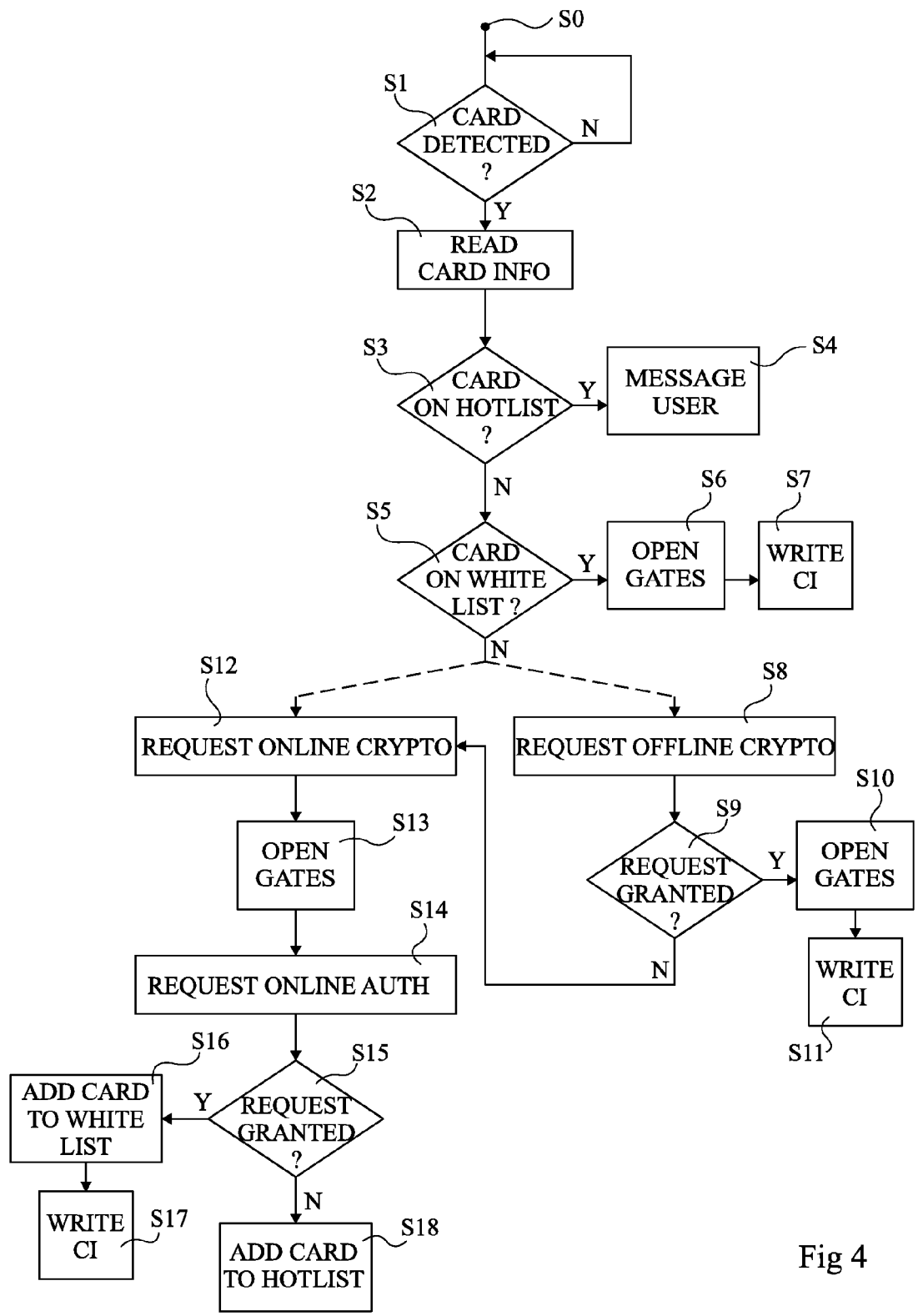
FIG. 4 is a flow diagram illustrating steps in a method according to embodiments of the present invention.

FIG. 4 shows a flow diagram illustrating steps implemented by the control block 214 during a method for controlling user access to a service.

From a start point S0, a first step S1 comprises determining whether a contactless payment card has been detected. In particular, the read device 210 for example periodically transmits a radio wave, which will cause a reaction in an RFID transponder of a payment card, if such a card is present. If no payment card is detected, step S1 is repeated.

When a payment card is detected, the next step is S2, in which the card details are read by the card reader 210 of FIG. 2.

After S2, the next step is S3, in which the control block 214 determines whether the payment card is on the hot list stored in memory portion 220, and if so, a message is displayed on display 212 to the user, as indicated by step S4, indicating that access to the service is denied.

If the card is not on the hot list, the next step after S3 is S5, in which it is determined whether the payment card is on the white list stored in memory portion 218.

If so, the next step is S6, in which the gates 206 are opened, allowing the user to access the service. Furthermore, after S6, a check-in record (CI) is for example generated in S7, and transmitted from the control block 214 to the back office server 234. The CI record is used to provide information on the use of the service by the user for billing purposes If in S5 it is determined that the payment card is not on the white list, then either an offline payment authorization starting with step S8 is performed, or an online payment authorization starting with step S12 is performed. As explained above, in some systems offline authorizations are always attempted first, whereas in other systems online authorizations are always made directly, and in yet alternative systems a decision between online and offline authorization is made based for example on the card type etc.

In the case that an offline request is initially attempted, in step S8, a request is made to the payment card for an offline authorization cryptogram.

Next, in step S9 it is determined whether the offline authorization request is granted by the payment card. In particular, if the COTA count limit of the payment card has not been exceeded, the offline cryptogram generation block 312 of the payment card responds by providing an offline authorization cryptogram, which is unique to this payment card. Thus, in this case, the request is granted, and the next step is S10, in which the gates 206 of the entry gate 202 are opened. After S10, in S11, a check-in record is generated and transmitted to the back office server 234. The offline authorization cryptogram is used at a later time by the back office server 234 to validate a payment request to the card issuer. Offline authorizations may be limited to a particular payment value.

If in S9 the offline payment authorization request is refused by the payment card, the next step is S12.

In S12, a request is made to the payment card for an online authorization cryptogram, and then in S13, the gates 206 of the entry gate 202 are opened allowing the user to access the service.

In a next step S14, the online payment authorization is requested, which involves establishing a connection with the remote authorization terminal 232 and sending the authorization cryptogram to it. In alternative embodiments this step could be performed before or during opening the gates. The remote authorization terminal 232 verifies the online authorization cryptogram and grants or denies the authorization request by sending a message to the control block 214.

The next step after S14 is S15, in which is determined by the control block 214 whether the authorization request has been granted. If so, the next step is S16, in which the identifier of the payment card is added to a white list, and then in step S17 a check-in record is generated and transmitted to the back office server 234. On the other hand, if the online payment authorization is denied, the next step after S15 is S18, in which the payment card is added to the hot list, and a message is for example displayed to the user.

Figures 5, 6:
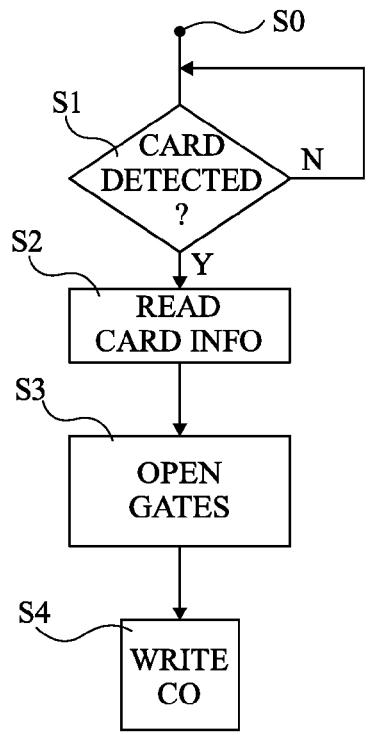
FIG. 5 is a further flow diagram illustrating steps in a further method according to embodiments of the present invention.
FIG. 6 illustrates an example of a back office database according to embodiments of the present invention.

FIG. 5 is a flow diagram illustrating an example of steps performed by the control block 224 of the exit gate 204.

Steps S1 and S2 are the same as those of FIG. 4, and will not be described again in detail. After S2, optionally, a check is made of whether the identifier of the payment card is on the white list or the hot list stored in memory portions 228, 230 respectively. This allows a message to be provided on the display 212 of the exit gate 204, for example indicating the charge accumulated by the use of the service, or in the case the payment card has been hot listed, a message asking the user to proceed to a ticket office to pay by the amount owed by alternative means.

After S2, the next step is S3, in which the gates 206 of the exit gate 204 are opened allowing the user to exit the service.

In a next step S4, a check-out record is generated, and provided to the back office server 234, such that the charges accumulated by the user can be determined.

In some embodiments, the CI record is enough to determining billing, if there is for example a fixed tariff for each access to the service, in which case no CO record is needed. Alternatively, both the CI record and CO record are used to determining the bill to the user.

FIG. 6 illustrates an example of a database 600 stored by the back office service 234 in order to control the accounts of the users of the system.

As illustrated, the database 600 comprises a list of payment cards each identified by their card number, and associated with each card number, the amount of a pre-payment authorization that has been accepted for the card. In particular, the pre-payment authorization is the amount of the last granted online or offline authorization request for the card. An online payment authorization amount might for example be 10 euros/dollars/pounds etc., while an offline authorization amount might for example be 5 euros/dollars/pounds etc. In the next column, associated with each payment card, the charges that have been accumulated by the card holder are indicated. When the accumulated charges approach close to or above the prepayment authorization amount, a new online or offline authorization is for example requested, either based on the original cryptogram, or a new cryptogram could be requested from the payment card on the next access to the service. If the new payment authorization request is granted, the card is maintained on the white list, while if it is denied, the card may be removed from the white list and added to the hot list. Updates to the white list and hot list are for example distributed regularly to the memories 216, 226 associated with the entry and exit gates 202, 204.

At regular periods, for example every month, the payment cards are for example billed based on the charges that have been accumulated by the user.

Thus, a system for controlling user access to a service has been described, in which a contactless payment card is used at an entry gate, and if it is determined that an online payment authorization should be requested, the user is allowed to access the service before online payment authorization is completed.

An advantage of the present invention is that the wait time for the user at the entry gate is substantially decreased when compared to the wait time associated with completing an online authorization request.

Furthermore, when a white list is used, users whose payment cards are authorized during the online authorization may be added to the white list such that the next time they present themselves at the entry gate, the gate can be opened immediately.

While a number of specific embodiments of the present invention have been described, it will be apparent to those skilled in the art that there are numerous variations and alterations that may be applied.

For example, it will be apparent to those skilled in the art that while an example of the hardware for implementing the system has been described, in alternative embodiments other hardware arrangements could be used.

For example some entry gates may not physically restrict access by the user, but for example indicate in other ways if access to the service is allowed or refused, such as by a noise from a speaker or a flashing light, to alert an operator, such as a bus driver, that access is allowed or refused. Furthermore, in some embodiments no exit gates are provided.

Furthermore, while examples of a payment card have been provided, it will be apparent to those skilled in the art that the invention would be applied to other types of contactless payment cards. Furthermore, in alternative embodiments, rather than an RFID contactless interface, other types of contactless interface could be used between the payment card and the card reader of the entry and exit gate.

The invention claimed is:

1. A system for controlling user access to a service comprising:
   a read device configured to read a payment card of a user;
   a first control block coupled to the read device and an entry gate, the first control block being configured to determine whether online payment authorization should be requested for said payment card, wherein if it is determined that online payment authorization should be requested, the first control block is further configured to make an online payment authorization request and to control the entry gate to allow said user access to the service prior to completing said online payment authorization for said payment card;
   a first memory coupled to said first control block and comprising a memory portion storing a white list indicating payment cards for which the first control block provides user access to the service without online payment authorization, wherein said first control block is configured to add said payment card to said white list if the online payment authorization is granted for that payment card;
   a further read device configured to read said payment card;
   a second control block coupled to the further read device and configured to control a second gate; and
   a second memory coupled to the second control block and comprising a memory portion storing the white list, wherein the white list is updated with modifications via a network and wherein the second control block, after the further read device reads the payment card, controls the second gate to open after determining whether the payment card is on the white list stored in memory.

2. The system of claim 1, wherein the first control block is further configured to request an offline payment authorization, and to determine that said online payment authorization should be requested if said offline payment authorization is denied.

3. The system of claim 1, wherein:
said white list comprises a list of identifiers each associated with payment cards;
said read device is configured to read an identifier of said payment card; and
said first control block is configured to determine that the online payment authorization should be requested if said read identifier of said payment card is not on said white list.

4. The system of claim 1, the first memory further comprising a memory portion storing a hot list indicating payment cards for which the first control block denies user access to the service, wherein said control block is configured to add said payment card to the hot list if the online payment authorization is denied for that payment card.

5. The system of claim 1, wherein said first control block is configured to determine that the online payment authorization should be requested if said payment card is not on said white list and if a request for offline payment authorization of said payment card is denied.

6. The system of claim 1, wherein said first control block is configured to request, after allowing said user access to the service, said online payment authorization for a payment value greater than a minimum charge associated with the use of the service.

7. The system of claim 1, wherein said first control block is configured to allow said user access to the service by controlling the entry gate to open, and wherein said second gate is an exit gate.

8. The system of claim 1, wherein said read device is configured to read said payment card by retrieving data from an RFID (radio frequency identification) transponder of the payment card.

9. A method of controlling user access to a service comprising:
reading by a read device electronic information from a payment card of a user;
determining by a first control block based on said electronic information whether or not online payment authorization should be requested for said payment card; and
if it is determined that online payment authorization should be requested for said payment card, making an online payment authorization request and controlling an entry gate by said first control block to allow the user access to the service prior to completing said online payment authorization for said payment card;
adding said payment card to a white list if the online payment authorization is granted for that payment card, the white list indicating payment cards for which user access to the service is permitted without online payment authorization, wherein said white list is stored in a memory portion of a first memory coupled to said first control block;
updating said white list with modifications via a network;
storing said modifications in a memory portion of a second memory coupled to a second control block configured to control a second gate comprising a further read device for reading said payment card;
reading, by the second control block via the further read device, the payment card;
determining, by the second control block, whether the payment card is on the white list stored in the second memory; and
opening, by the second control block based on the determination, the second gate.

10. The method of claim 9, further comprising requesting an offline payment authorization, and determining that said online payment authorization should be requested if said offline payment authorization is denied.

11. The method of claim 9, further comprising, prior to allowing the user access to the service, requesting an online authorization cryptogram from said payment card and after allowing the user access to the service, requesting an online payment authorization from a remote server based on said online authorization cryptogram.

12. The method of claim 9, further comprising determining by said first control block that an online payment authorization should be requested if said payment card is not on said white list and if a request for offline payment authorization for said payment card is denied.

13. The method of claim 9, further comprising adding said payment card to a hot list if the online payment authorization is denied for said payment card, wherein the hot list indicates payment cards that should not be accepted by the system.

14. The method of claim 9, further comprising, after allowing said user access to the service, requesting by said first control block said online payment authorization for a payment value greater than a minimum charge associated with the use of the service.

\* \* \* \* \*